(12) United States Patent
Hom et al.

(10) Patent No.: US 10,061,518 B2
(45) Date of Patent: *Aug. 28, 2018

(54) AVAILABLE FRAME QUEUE PROCESSING

(71) Applicant: INTERNATIONAL BUSINESS MACHINES CORPORATION, Armonk, NY (US)

(72) Inventors: David Hom, Poughkeepsie, NY (US); Harris M. Morgenstern, Wappingers Falls, NY (US); Steven M. Partlow, Beacon, NY (US); Scott B. Tuttle, Staatsburg, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,404

(22) Filed: Nov. 29, 2017

(65) Prior Publication Data
US 2018/0074706 A1    Mar. 15, 2018

Related U.S. Application Data

(63) Continuation of application No. 14/738,227, filed on Jun. 12, 2015, now Pat. No. 9,898,198.

(51) Int. Cl.
*G06F 12/00* (2006.01)
*G06F 13/00* (2006.01)
(Continued)

(52) U.S. Cl.
CPC ............ *G06F 3/061* (2013.01); *G06F 3/0659* (2013.01); *G06F 3/0683* (2013.01)

(58) Field of Classification Search
CPC ...... G06F 3/061; G06F 3/0611; G06F 3/0613; G06F 3/0655; G06F 3/0656; G06F 3/0659; G06F 3/0671; G06F 3/0673; G06F 3/0674; G06F 3/0676; G06F 3/0677; G06F 3/0679; G06F 3/068; G06F 3/0682; G06F 3/0683;
(Continued)

(56) References Cited

U.S. PATENT DOCUMENTS 5,778,411 A * 7/1998 Demoss ................ G06F 3/0607
                                                    710/68
5,835,959 A * 11/1998 McCool ................ G06F 12/023
                                                    711/171
(Continued)

*Primary Examiner* — Daniel C Chappell
(74) *Attorney, Agent, or Firm* — Cantor Colburn LLP; William A. Kinnaman, Jr.

(57) ABSTRACT

In one embodiment, a computer-implemented method includes building an available frame header queue (AFHQ). The AFHQ includes one or more headers, each header including one or more frame references being no more than a maximum count of frame references. Each of the one or more frame references of each of the one or more headers refers to an available frame. A frame request is received for one or more requested frames. One or more frame references are extracted, by a computer processor, from the AFHQ in response to the frame request. The extracting includes extracting from the AFHQ one or more requested headers including the one or more frame references referring to at least a portion of the one or more requested frames.

1 Claim, 5 Drawing Sheets

(51) Int. Cl.
*G06F 13/28* (2006.01)
*G06F 3/06* (2006.01)

(58) Field of Classification Search
CPC .... G06F 3/0685; G06F 3/0686; G06F 3/0688; G06F 3/0689; G06F 2003/0691; G06F 2003/0692; G06F 2003/0694; G06F 2003/0695; G06F 2003/0697; G06F 2003/069

See application file for complete search history.

(56) References Cited

U.S. PATENT DOCUMENTS

| | | | | |
|---|---|---|---|---|
| 5,872,938 A * | 2/1999 | Williams | | G06F 17/30958 707/E17.011 |
| 6,202,101 B1 * | 3/2001 | Chin | | G06F 13/1621 710/5 |
| 6,442,661 B1 * | 8/2002 | Dreszer | | G06F 12/023 707/999.202 |
| 6,574,706 B2 * | 6/2003 | Sutherland | | G06F 12/109 711/117 |
| 6,820,168 B2 * | 11/2004 | Tanaka | | G06F 3/0622 711/163 |
| 7,437,528 B1 | 10/2008 | Moore et al. | | |
| 7,801,120 B2 * | 9/2010 | Steinmetz | | G06F 3/0613 370/360 |
| 8,447,900 B1 * | 5/2013 | Zheng | | G06F 5/10 710/52 |
| 8,473,693 B1 * | 6/2013 | Muppalaneni | | G06F 5/065 707/781 |
| 8,793,444 B2 * | 7/2014 | Foster | | G06F 12/04 711/154 |
| 9,189,165 B2 * | 11/2015 | Koh | | G06F 3/0631 |
| 2003/0163644 A1 * | 8/2003 | Hoang | | G06F 12/128 711/136 |
| 2011/0016284 A1 * | 1/2011 | Balan | | H04L 49/9015 711/170 |
| 2014/0059284 A1 * | 2/2014 | Fang | | G06F 12/02 711/104 |
| 2014/0149674 A1 * | 5/2014 | Solihin | | G06F 12/0826 711/133 |
| 2014/0380017 A1 | 12/2014 | Robin et al. | | |
| 2015/0032986 A1 * | 1/2015 | Moore | | G06F 9/00 711/171 |
| 2016/0028544 A1 * | 1/2016 | Hyde | | H04L 9/0869 380/44 |
| 2016/0110121 A1 * | 4/2016 | Singh | | G06F 3/0613 711/156 |
| 2016/0147448 A1 * | 5/2016 | Schreter | | G06F 3/0604 711/159 |

* cited by examiner

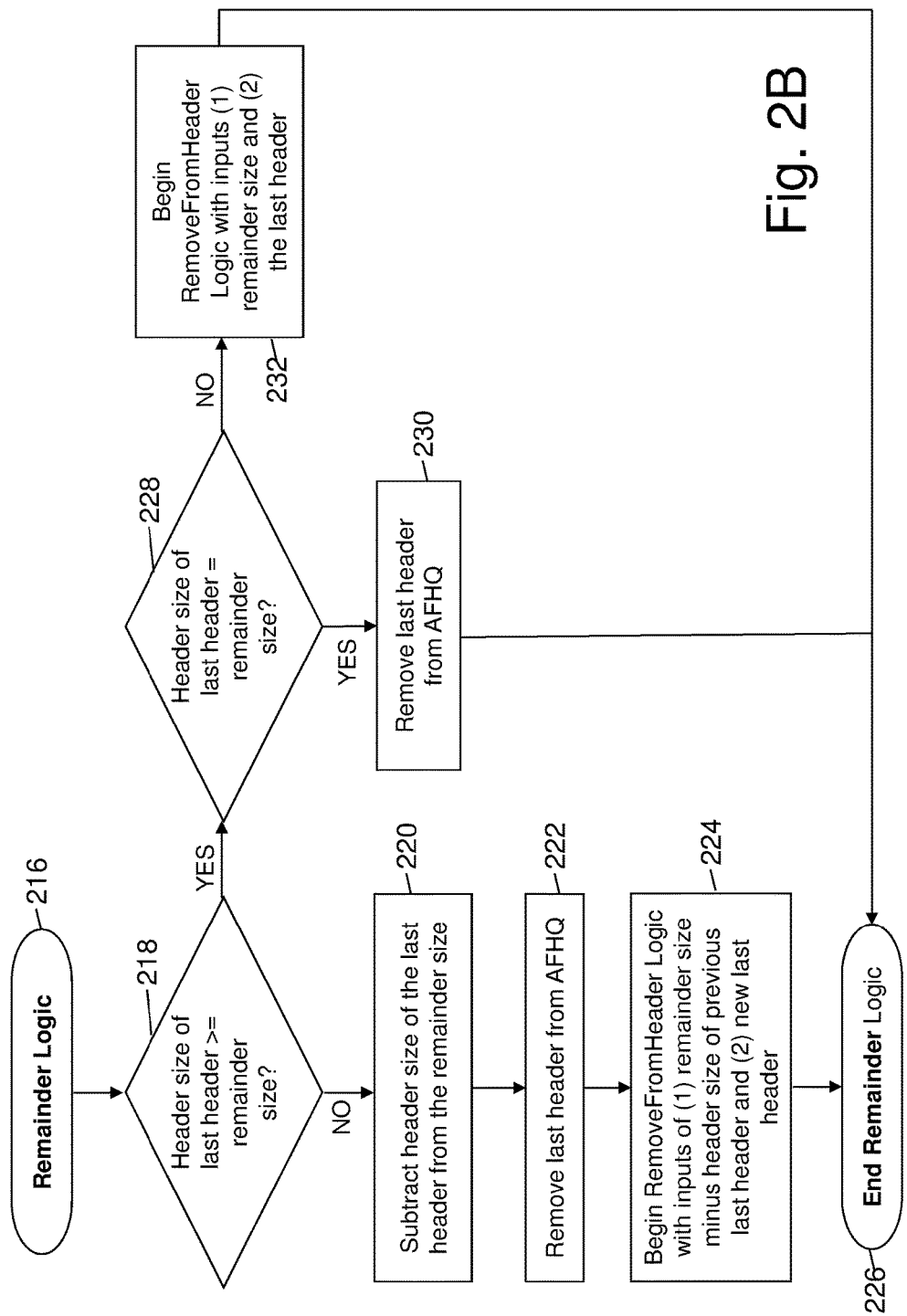

AVAILABLE FRAME QUEUE PROCESSING

PRIORITY

This application is a continuation of and claims priority from U.S. patent application Ser. No. 14/738,227, filed on Jun. 12, 2015, entitled "IMPROVING AVAILABLE FRAME QUEUE PROCESSING," the entire contents of which are incorporated herein by reference.

BACKGROUND

Various embodiments of this disclosure relate to managing frame queues and, more particularly, to improving available frame queue processing.

A frame is a block of real memory. Available frame queues (AFQs) are queues of references to frames and are designed to satisfy frame requests when storage space is needed. Due to the use of an AFQ, a computer system can avoid a linear search of storage to find available frames, because available frames are referenced on the AFQ. Thus, when virtual memory is accessed for data not yet in real memory, a frame request is generated, and in response to the request, the computer system may simply dequeue a frame reference from the AFQ.

There are instances where a frame request asks for more than a single frame. In this case, the computer system must access the AFQ for a longer period in order to dequeue multiple frame references. AFQs are serialized and thus require a lock for exclusive access. As a result, dequeuing multiple frames requires holding the AFQ serialization for an increased period. If there are multiple waiting frame requests, which may be made by different threads, for example, other frame requests may be forced to wait for an increased period while multiple frames are dequeued from the AFQ.

SUMMARY

In one embodiment of this disclosure, a computer-implemented method includes building an available frame header queue (AFHQ). The AFHQ includes one or more headers, each header including one or more frame references being no more than a maximum count of frame references. Each of the one or more frame references of each of the one or more headers refers to an available frame. A frame request is received for one or more requested frames. One or more frame references are extracted, by a computer processor, from the AFHQ in response to the frame request. The extracting includes extracting from the AFHQ one or more requested headers including the one or more frame references referring to at least a portion of the one or more requested frames.

In another embodiment, a system includes a memory and one or more computer processors communicatively coupled to the memory. The one or more computer processors are configured to build an AFHQ including one or more headers. Each header includes one or more frame references being no more than a maximum count of frame references. Each of the one or more frame references of each of the one or more headers refers to an available frame. The one or more computer processors are further configured to receive a frame request for one or more requested frames. The one or more computer processors are further configured to extract one or more frame references from the AFHQ in response to the frame request. The extracting includes extracting from the AFHQ one or more requested headers including the one or more frame references referring to at least a portion of the one or more requested frames.

In yet another embodiment, a computer program product for managing an AFHQ includes a computer readable storage medium having program instructions embodied therewith. The program instructions are executable by a processor to cause the processor to perform a method. The method includes building an available frame header queue (AFHQ). The AFHQ includes one or more headers, each header including one or more frame references being no more than a maximum count of frame references. Each of the one or more frame references of each of the one or more headers refers to an available frame. Further according to the method, a frame request is received for one or more requested frames. One or more frame references are extracted from the AFHQ in response to the frame request. The extracting includes extracting from the AFHQ one or more requested headers including the one or more frame references referring to at least a portion of the one or more requested frames.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 2A-2C are flow diagrams of a method for managing a header queue, according to some embodiments of this disclosure.

DETAILED DESCRIPTION

According to some embodiments of this disclosure, a header queue may be used, where each header maintains a set of references to frames. Various embodiments of queue-management systems, methods, and computer program products are configured to manage the header queue to efficiently provide frames in response to frame requests.

Figure 1:
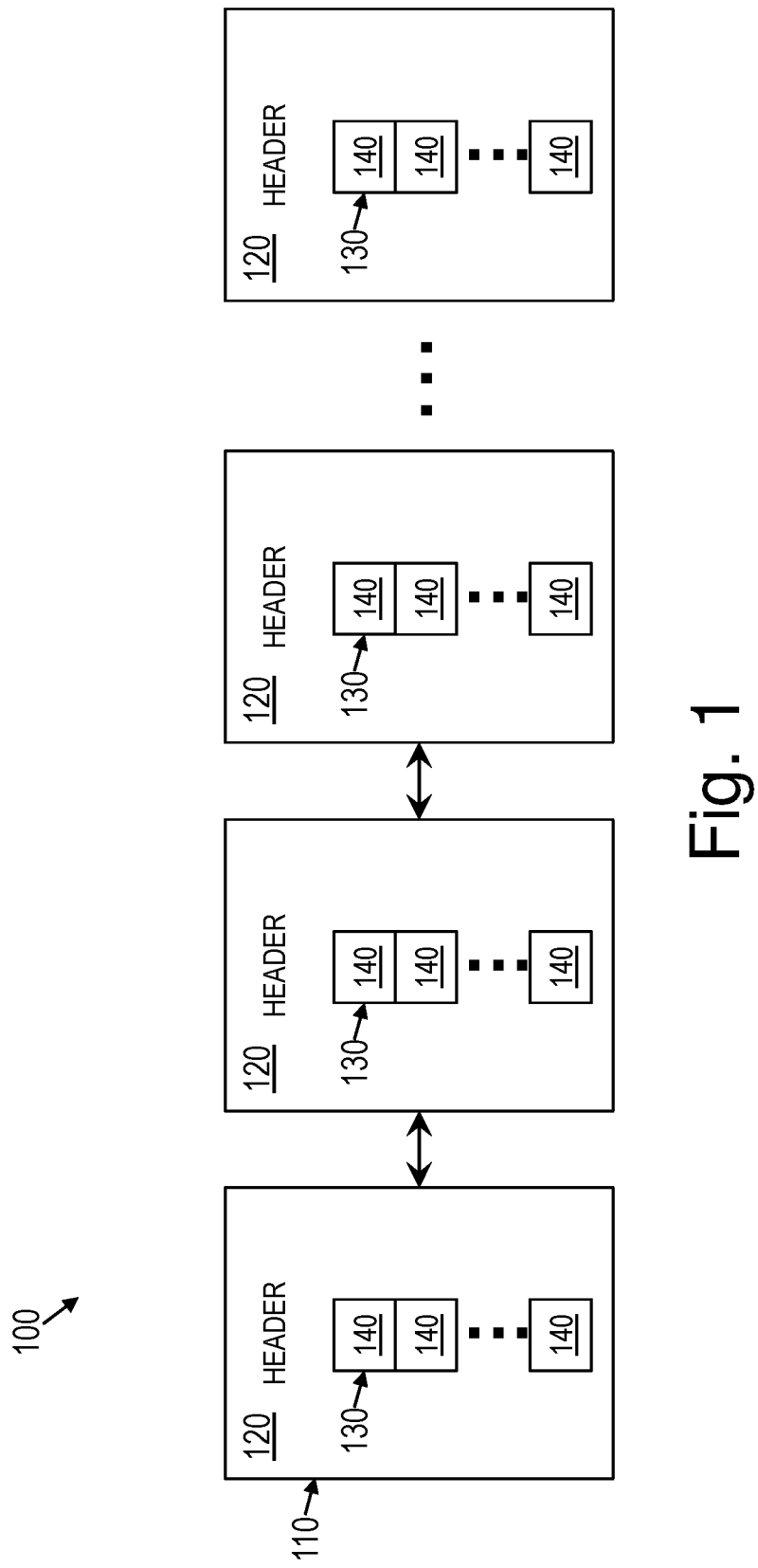
FIG. 1 is a block diagram of a queue-management system, according to some embodiments of this disclosure.

FIG. 1 is a block diagram of a queue-management system 100, according to some embodiments of this disclosure. As shown, the queue-management system 100 may include an available frame header queue (AFHQ) 110. The AFHQ 110 may include one or more headers 120, or queue headers, each of which may include or reference a corresponding inner queue 130. Each inner queue may include a set of one or more frame references 140, each of which refers to an available frame. It will be understood that, although discussion herein of the queue-management system 100 focuses on AFHQs 110 specifically related to frames, embodiments of the queue-management system 100 need not be limited to queues for frames. Rather, the queue-management system 100 may be used to manage queues of various types for various elements other than frames. Throughout this disclosure, it will just be understood that a different type of header queue with different elements may be substituted for the AFHQ and its frame references. It will be further understood that, although four headers 120 with three frame references 140 each are depicted in FIG. 1, these quantities can vary, and the quantities pictured are for illustration purposes only.

While standard available frame queues (AFQs) work well when a frame request can be satisfied with a single frame, an AFQ proves problematic when a request is received for multiple frames. In such a case, a conventional AFQ would need to be locked while multiple frames are dequeued.

The AFHQ 110 may be a queue of headers 120. Each header 120 may include a queue of one or more elements, where each element may be a frame reference 140. The AFHQ 110 may reduce queue serialization time, as compared to a conventional AFQ, because it may be faster to dequeue a smaller number of elements, each with multiple frame references 140, rather than one element for each frame reference 140. As a result, use of an AFHQ 110 can avoid backups from threads waiting for the serialization.

The AFHQ 110 may include a global header anchor (GHA), which may include a pointer to the first header 120 and a pointer to the last header 120 of the AFHQ 110. Updates to these pointers may be serialized with an available frame queue (AFQ) lock, which may be a conventional spin lock existing in the art. The GHA may include a maximum element count for each inner queue 130 of the headers 120, which may define the maximum number of frame references 140 for each inner queue 130 of the headers 120. In some embodiments, this maximum element count may be modifiable by a user to customize the AFHQ 110 for expected frame request patterns. For instance, if most frame requests ask for a hundred frames, then a maximum element count of one thousand is probably not ideal. Each header 120 in the AFHQ 110 may include a pointer to each of the previous and next headers 120 within the AFHQ 110. Within the inner queue 130 of each header 120, each frame reference 140 may include a pointer to the next frame reference 140 in that same inner queue 130. Each header 120 may include a count of the number of frame references 140 in its inner queue 130.

In some embodiments, each header 120, with the exception of the last header in the AFHQ 110, may include an inner queue 130 with a count of frame references 140 equal to the maximum element count. In other words, each header 120 other than the last header 120 may have a header size equal to the maximum element count. The last header 120 may have a header size of no more than the maximum element count. The inner queue 130 of the last header 120 may have a header size equal to the remainder of the total number of frame references 140 divided by the maximum element count. Given this arrangement of frame references, it may be assumed that each header 120 other than the last one holds a number of frame references 140 equal to the maximum element count.

Given the operations described in this disclosure, one of skill in the art will understand how and when to manipulate the various pointers in the AFHQ 110.

To respond to a frame request, the queue-management system 100 may lock the AFHQ 110 and return one or more frame references 140, which may be encapsulated, in full or in part, within headers 120.

When a frame request is received, the queue-management system 100 may decide which headers 120 or frame references 140 to dequeue. To this end, the queue-management system 100 may determine whether the request size (i.e., the number of frames requested) is a multiple of the maximum element count. If so, then the queue-management system may extract the number of headers 120 needed to exactly fulfill the request size. For example, if the frame request asks for three hundred frames and the maximum element count is one hundred, the queue-management system 100 may dequeue and return three headers 120, for a total of three hundred frame references. The headers 120 needed to fulfill the request may be extracted from the front of the AFHQ 110, given that the last header 120 may have fewer frame references 140 than the others. The AFQ lock may be obtained before the dequeuing and may be released afterward.

If the request size is not a multiple of the maximum element count, the queue-management system 100 may define a variable, referred to herein as RequestedHeaders, as the floor of the request size divided by the maximum element count. The queue-management system 100 may additionally calculate a size remainder of dividing the request size by the maximum element count. This size remainder may be the count of frame references 140 needed to fulfill the frame request in addition to those included in full headers 120. In some cases, the request size may be smaller than the maximum element count, and in that case, RequestedHeaders may be zero and the size remainder may represent the count of frame references 140 needed to fulfill the frame request in total.

If the size remainder is equal to the header size of the last header 120, then the last header 120 may be extracted in response to the request and returned in addition to other headers 120 in a quantity equal to RequestedHeaders. If the size remainder is less than the header size of the last header 120, then the queue-management system 100 may extract from the last header 120 a set of frame references 120 in a quantity equal to the size remainder, and may return those extracted frame references 140 along with other headers 120 in a quantity equal to RequestedHeaders. If the size remainder is greater than the header size of the last header 120, the last header 120 may be included in the response to the frame request, and the size remainder may be recalculated as the previous size remainder minus the header size of the last header 120. The queue-management system 100 may then extract from the second-to-last header 120 a set of frame references 140 in a quantity equal to the size remainder. In some embodiments, this extraction from the second-to-last header 120 may occur after the last header has already been removed from the AFHQ 110. In that case, the extraction may then be performed on the new last header after removal, which may nonetheless be referred to herein as the second-to-last header 120, having been in the second-to-last position at the time of the frame request. After extracting the frame references 140, the queue-management system 100 may return a number of headers 120 in quantity equal to RequestedHeaders and the extracted frame references 140. If the extracted frame references 140 came from the second-to-last header 120 (i.e., if the original value of size remainder was greater than the header size of the last header 120), the last header 120 may also be returned.

In some embodiments, the AFQ lock may be obtained after calculating the number of headers 120 in RequestedHeaders and before extracting frame references 140 to fulfill the size remainder. The AFQ lock may be released after dequeuing the headers 120 and extracting the frame references 140 to fulfill the size remainder.

In some cases, as discussed above, the queue-management system 100 may extract a chain, or set, of frame references 140 from a header 120 when not all frame references 140 in that header 120 are needed to respond to the frame request. In these cases, the queue-management system 100 may operate on a particular header 120 (e.g., the last header 120 in the AFHQ 110), and the queue-management system 100 may seek to extract a specific count of frame references, herein referred to as FramesCount (e.g., having a value of the size remainder). The queue-management system 100 may calculate the smallest traversal count to extract a number of frame references 140 equal to FramesCount. For example, given a FramesCount of ten and a header size of one hundred for the header 120 in question, the queue-management system 100 may count off ten frame references 140 for extraction. Given a FramesCount of ninety, the queue-management system 100 may again count off ten frame references 140, because this may be more efficient than counting off ninety, and may extract the remaining frame references 140 not counted off. To generalize this, the queue-management system 100 may determine the minimum of FramesCount and the header size minus FramesCount, and this minimum may be used as the traversal count. A remaining count may then be defined as the header size less the traversal count, which may also be the maximum of FramesCount and the header size minus FramesCount.

The queue-management system 100 may iterate through the frame references 140 in the inner queue 130 of the header 120, where the number of iterations is equal to the traversal count. If the traversal count is equal to FramesCount, the queue-management system 100 may extract the frame references 140 through which the queue-management system 100 iterated, which would be a number of frame references 140 equal to FramesCount. However, if the remaining count is equal to FramesCount, the queue-management system 100 may extract the frame references 140 not iterated through.

Figure 2A:
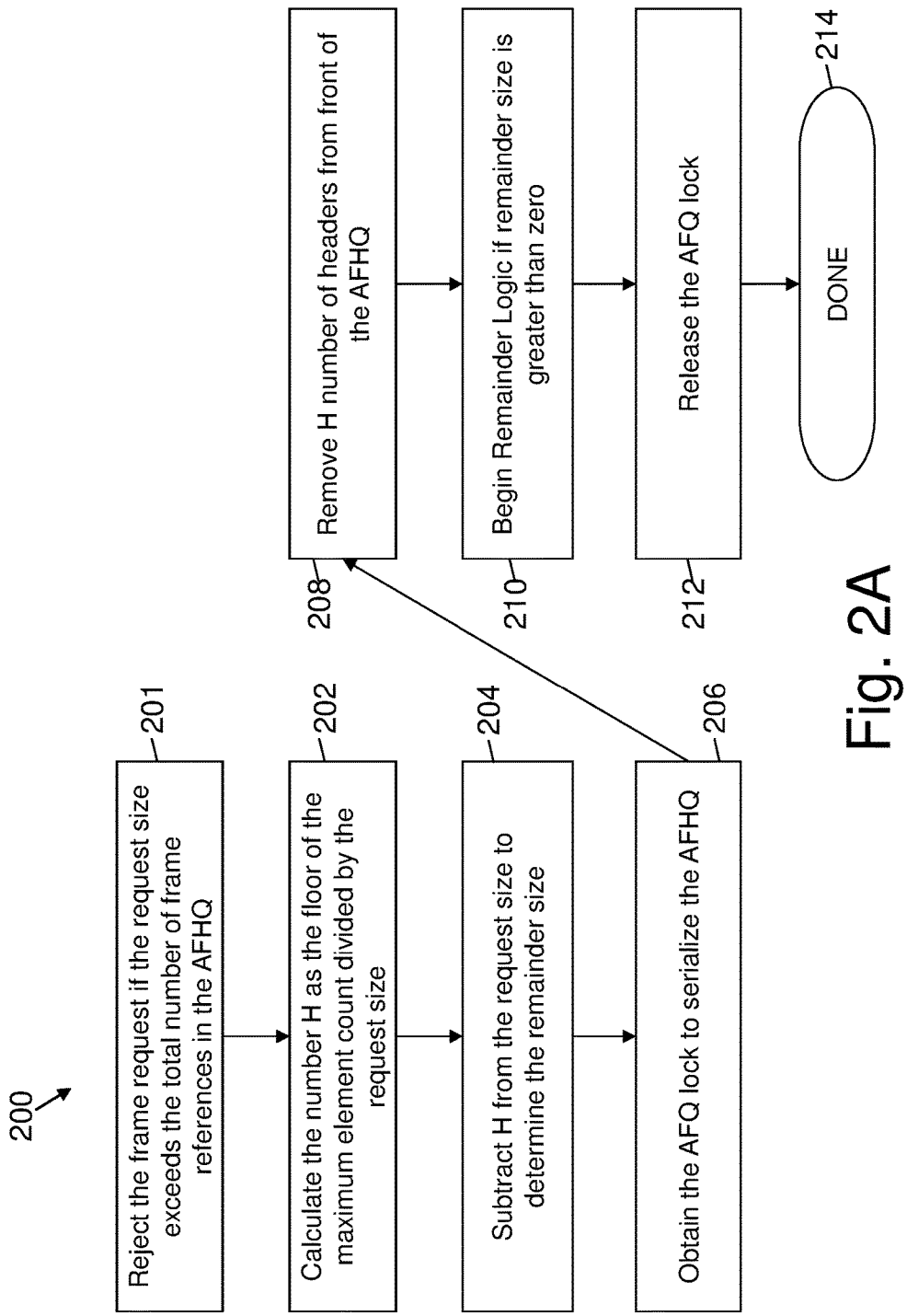
Figure 2C:
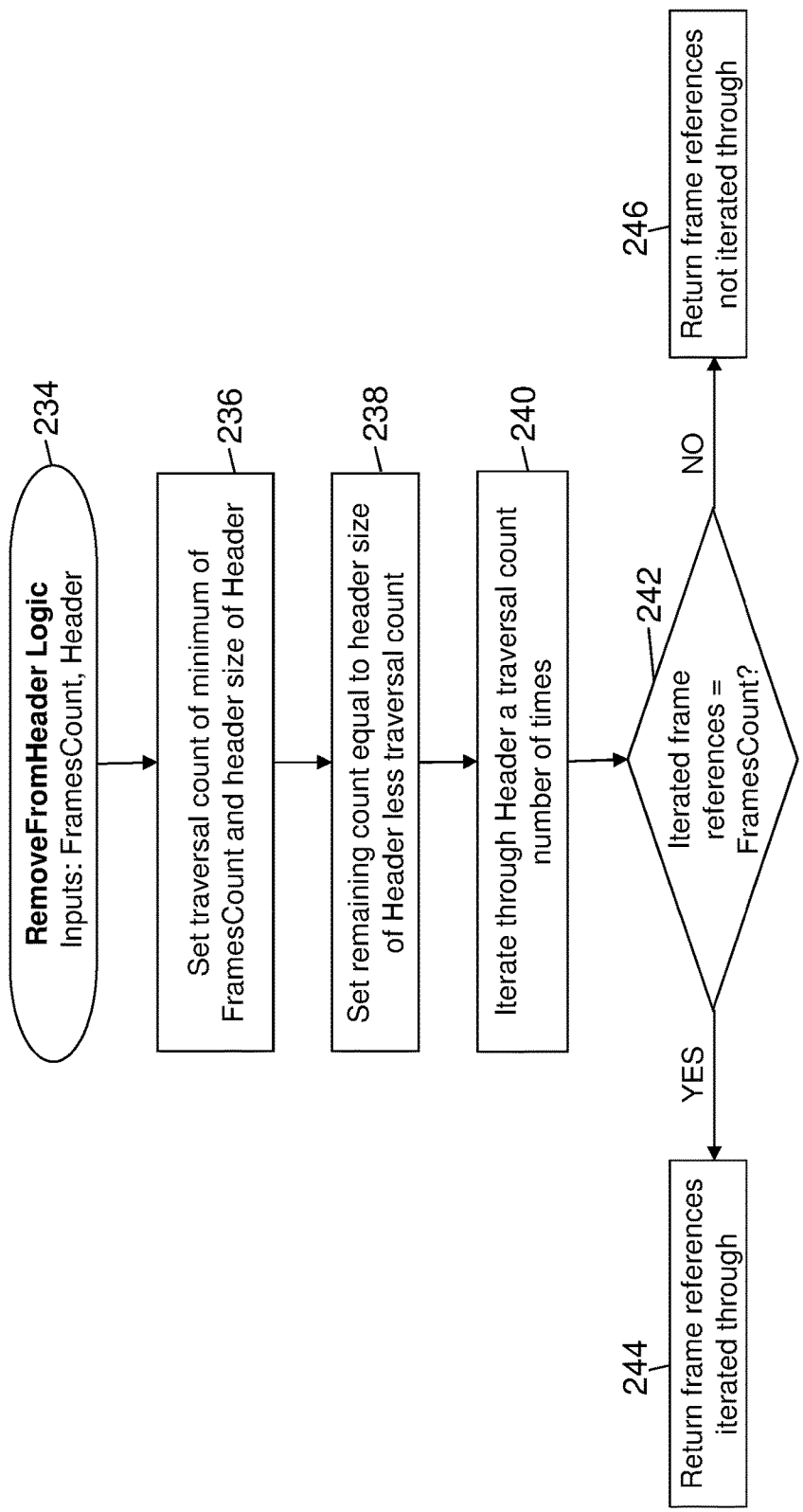

FIGS. 2A-2C are flow diagrams of a method 200 for managing a header queue, specifically an AFHQ 110, according to some embodiments of this disclosure.

The method 200 may begin after a frame request is received. At block 201 of FIG. 2A, it may be determined whether the request size of the frame request exceeds the size of the AFHQ 110, i.e., the total number of frame references 140 in the AFHQ 110. If the request size exceeds the size of the AFHQ 110, the frame request may be rejected. In some embodiments, the queue-management system 100 may maintain a total count of frame references 140 in the AFHQ 110, and this count may be maintained in the GHA for example. Thus, determining whether the request size exceeds the size of the AFHQ 110 may be performed by comparing the request size to this total count of frame references 140.

At block 202, the queue-management system 100 may calculate a number H as the floor of the maximum element count divided by the request size of a received frame request. At block 204, H may be subtracted from the request size to determine a remainder size, which may be the number of frames requested and not fulfilled by maximum-size headers 120. At block 206, the AFQ lock may be obtained for the AFHQ 110. At block 208, zero or more headers 120 in the quantity of H may be removed from the AFHQ 110. At block 210, Remainder Logic may begin at block 216 if the remainder size is greater than zero. At block 212, the AFQ lock may be released.

At block 216 of FIG. 2B, the Remainder Logic may begin if called from FIG. 2A, to identify the remaining frame references 140 needed to fulfill the frame request. At decision block 218, it may be determined whether the header size of the last header 120 is greater than or equal to the remainder size. If not, then the header size of the last header 120 is less than the remainder size, and at block 220, the header size of the last header 120 may be subtracted from the remainder size. At block 222, the last header 120 may be removed from the AFHQ 110 to be returned in response to the frame request. At block 224, RemoveFromHeader Logic may begin at block 234, with input of (1) the remainder size minus the header size of the previous last header 120 and (2) the new last header 120. At block 226, the Remainder Logic may end. If the header size of the last header 120 is greater than or equal to the remainder size at decision block 218, then at decision block 228, it may be determined whether the header size of the last header 120 is equal to the remainder size. If so, then at block 230, the last header 120 may be removed from the AFHQ 110 to be returned in response to the frame request. If, however, the header size of the last header 120 is not equal to the remainder size at decision block 228, then at block 232, the RemoveFromHeader Logic may begin at block 234 with inputs of (1) the remainder size and (2) the last header 120.

At block 234 of FIG. 2C, the RemoveFromHeader Logic may begin if called in FIG. 2B, to extract from an input header 120, Header, the input number of frame references, FramesCount. At block 236, a traversal count may be set as the minimum of FramesCount and the header size of the input header 120. At block 238, a remaining count may be set equal to the header size of the input header 120 minus the traversal count. At block 240, the frame references 140 in the input header 120 may be iterated through a number of times equal to the traversal count. At decision block 242, it may be determined whether the number of iterated frame references 140 is equal to FramesCount. If so, then at block 244, the frame references 140 iterated through may be returned. If not, then at block 246, the frame references 140 not iterated through may be returned.

Figure 3:
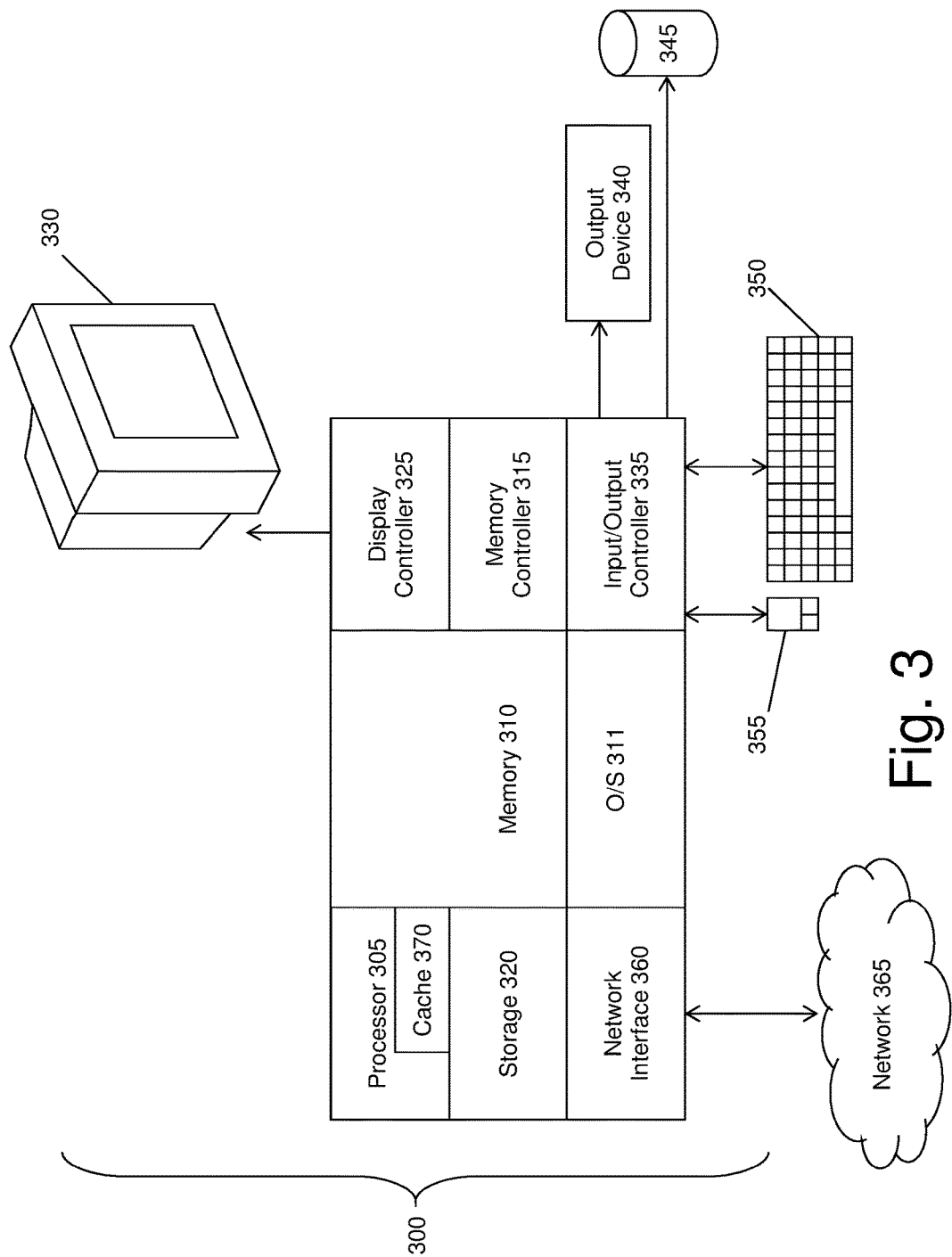
FIG. 3 is a block diagram of a computer system for implementing some or all aspects of the queue-management system, according to some embodiments of this disclosure.

FIG. 3 illustrates a block diagram of a computer system 300 for use in implementing a queue-management system or method according to some embodiments. The queue-management systems and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the queue-management systems and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Queue-management systems and methods according to this disclosure may be embodied, in whole or in part, in computer program products or in computer systems 300, such as that illustrated in FIG. 3.

Technical effects and benefits of some embodiments of the queue-management system 100 include the ability to reduce the serialization period of a queue, including a queue of references to available frames, by using a header queue, with each header 120 containing one or more frame references 140. By combining frame references 140 into headers 120 and placing the headers 120 on the queue, the time for extracting frame references 140 in bulk may be reduced.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method, comprising:
building an available frame header queue (AFHQ), the building the AFHQ comprising:
building one or more headers, each header comprising a queue having a plurality of frame references being no more than a maximum count of frame references, wherein each of the plurality of frame references of each of the one or more headers refers to an available frame;
defining a global header anchor comprising:
a start pointer pointing to a first header of the one or more headers in the AFHQ;
an end pointer pointing to a last header in the AFHQ; and
a maximum count variable defining the maximum count, wherein each of the one or more headers, except the last header of the AFHQ, includes a count of frame references equal to the maximum count;
receiving a frame request for one or more requested frames; and extracting, by a computer processor, from the AFHQ one or more requested frame references in response to the frame request, wherein the frame request specifies a requested quantity for the one or more requested frames, and wherein the extracting comprises:
  calculating a header quantity by taking the floor of dividing the requested quantity by the maximum count;
  selecting one or more headers, the selecting comprising counting for extraction a quantity of headers equal to the header quantity in the one or more headers;
  calculating a remainder quantity by taking the remainder of dividing the requested quantity by the maximum count;
  determining that the reminder quantity is greater than a size of the last header in the AFHQ;
  recalculating the remainder quantity as the remainder quantity less the size of the last header in the AFHQ; and
  selecting, in a second-to-last header of the AFHQ, one or more frame references, the selecting the one or more frame references comprising counting for extraction a quantity of frame references equal to the recalculated remainder quantity in the second-to-last header of the AFHQ; and
returning in response to the frame request the one or more frame references, the last header of the AFHQ, and the selected one or more headers.

* * * * *